(12) United States Patent
Prokhorov

(10) Patent No.: US 9,933,515 B2
(45) Date of Patent: Apr. 3, 2018

(54) SENSOR CALIBRATION FOR AUTONOMOUS VEHICLES

(71) Applicant: Toyota Motor Engineering & Manufacturing North America, Inc., Erlanger, KY (US)

(72) Inventor: Danil V. Prokhorov, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 500 days.

(21) Appl. No.: 14/565,293

(22) Filed: Dec. 9, 2014

(65) Prior Publication Data

US 2016/0161602 A1    Jun. 9, 2016

(51) Int. Cl.
G01S 7/497    (2006.01)
G01S 17/93    (2006.01)
G01S 7/40     (2006.01)
G01S 13/86    (2006.01)
G01S 13/93    (2006.01)

(52) U.S. Cl.
CPC .......... *G01S 7/4972* (2013.01); *G01S 7/4026* (2013.01); *G01S 13/865* (2013.01); *G01S 13/867* (2013.01); *G01S 13/931* (2013.01); *G01S 17/936* (2013.01)

(58) Field of Classification Search
CPC .... G01S 7/4972; G01S 13/931; G01S 13/865; G01S 13/867; G01S 7/4026; G01S 17/936
USPC .......................... 340/436; 359/633; 342/174
See application file for complete search history.

(56) References Cited

U.S. PATENT DOCUMENTS

| 8,280,665 | B2 | 10/2012 | Nakamura et al. |
| 2008/0031514 | A1 | 2/2008 | Kakinami |
| 2008/0231710 | A1 | 9/2008 | Asari et al. |
| 2010/0168957 | A1* | 7/2010 | Takahashi ............ G01S 17/936 701/29.2 |
| 2010/0235129 | A1 | 9/2010 | Sharma et al. |

(Continued)

FOREIGN PATENT DOCUMENTS

| JP | 2006350697 A | 12/2006 |
| JP | 2007118887 A | 5/2007 |
| WO | 2014068302 A1 | 5/2014 |

OTHER PUBLICATIONS

Zhang et al.; Videre: Journal of Computer Vision Research; The MIT Press; Fall, 1997; vol. 1, No. 1; Massachusetts Institute of Technology.

*Primary Examiner* — Bo Fan
(74) *Attorney, Agent, or Firm* — Christopher G. Darrow; Darrow Mustafa PC

(57) ABSTRACT

Systems and methods for calibrating sensors for an autonomous vehicle are disclosed. A calibration guide disposed on the vehicle can indicate to a user the correct location for a calibration object to be placed for a calibration procedure. In one implementation, a laser guide can project an image indicating the correct location and orientation for the calibration object. In another implementation, an extendible arm disposed on the vehicle can suspend the calibration object at the correct location and orientation. In another implementation, an autonomous robot carrying the calibration object can autonomously bring the calibration object to the correct location. The calibration guide can be unobtrusively stored within the vehicle when not in use.

20 Claims, 4 Drawing Sheets

(56) References Cited

U.S. PATENT DOCUMENTS

| | | | | |
|---|---|---|---|---|
| 2010/0253594 | A1* | 10/2010 | Szczerba | G01S 13/723 345/7 |
| 2010/0254019 | A1* | 10/2010 | Cui | G01S 13/723 359/633 |
| 2010/0289632 | A1* | 11/2010 | Seder | G01S 13/723 340/436 |
| 2010/0292886 | A1* | 11/2010 | Szczerba | G01C 21/365 701/31.4 |
| 2011/0199254 | A1* | 8/2011 | Bishop | G01S 13/89 342/179 |
| 2013/0088382 | A1* | 4/2013 | Lee | G01S 7/4026 342/174 |
| 2014/0032012 | A1* | 1/2014 | Joshi | G01S 13/865 701/1 |
| 2014/0240690 | A1* | 8/2014 | Newman | G01S 7/4808 356/4.01 |

* cited by examiner

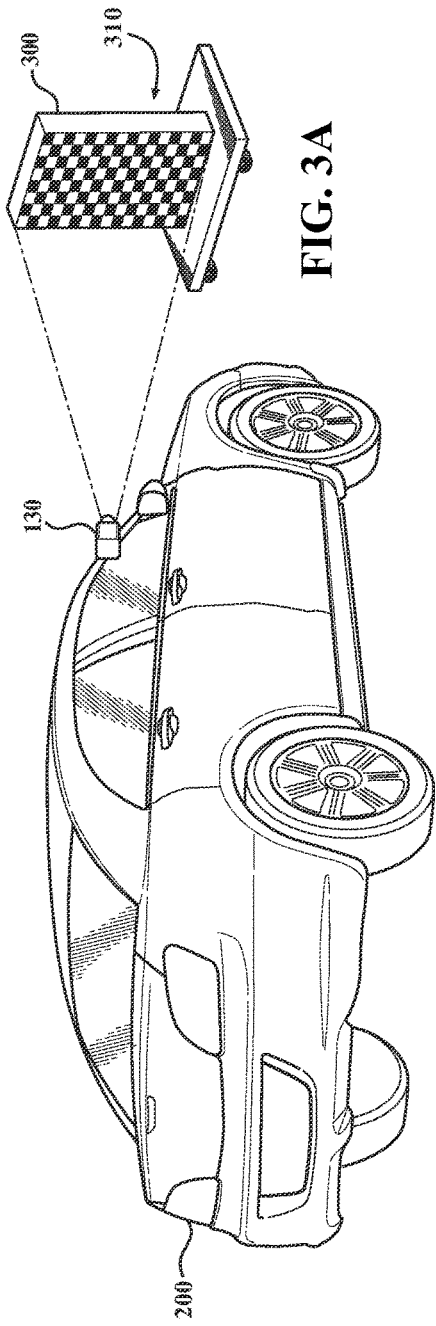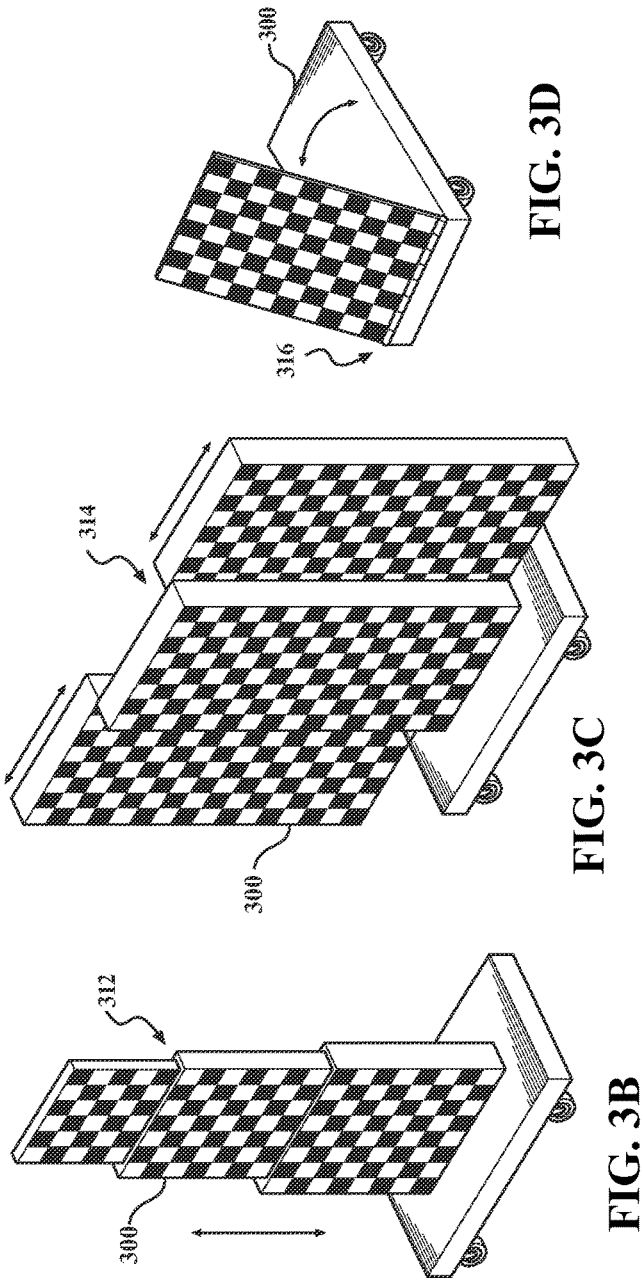

SENSOR CALIBRATION FOR AUTONOMOUS VEHICLES

BACKGROUND

This disclosure relates to sensors for autonomous or highly automated vehicles and specifically the calibration thereof. Some vehicles are configured to operate autonomously, with no or very little input required by the driver. Instead, vehicle systems are controlled by a computing device associated with the vehicle, using information about the vehicle's movement and the surrounding driving environment captured by various sensors (such as cameras) disposed on or otherwise affixed to various points on the vehicle. Over time, these sensors can move out of alignment and may need to be recalibrated. If left uncalibrated, the reliability of the information obtained by the computing device from the sensors can be negatively affected.

One method of calibrating a camera involves displaying an object with a predefined geometry at a known position relative to the camera. Because the geometry of the object is known in advance, a computer controlling the camera can compensate for variations between the object as observed and the known actual dimensions of the object. Thus the camera is calibrated. One way of ensuring a consistent geometry on the object is to use a panel patterned with a predefined pattern having known dimensions. Checkerboard patterns are commonly used for this purpose.

One challenge with this method of visual calibration is that one must ensure that the calibration object must placed in the predefined position accurately and with substantial precision. This can require expertise and experience in robotics and mathematics, and is likely out of the reach of ordinary consumers. Therefore, with respect to an autonomous passenger vehicle, a driver will require professional assistance and will have to bring the vehicle to the dealership in order to have the vehicle's sensors calibrated.

SUMMARY

Disclosed herein are systems and methods for calibrating sensors for an autonomous vehicle. A calibration guide disposed on the vehicle can indicate to a user the correct location and positioning for a calibration object to be placed for an auto-calibration procedure. In one implementation, a laser guide can project an image indicating the correct location and positioning for the calibration object. In another implementation, an extendible arm disposed on the vehicle can suspend the calibration object at the correct location and positioning. In another implementation, an autonomous robot carrying the calibration object can autonomously bring the calibration object to the correct location and in the correct position and orientation. The calibration guide can be stored unobtrusively within the vehicle when not in use.

In one exemplary implementation, a system is disclosed, comprising: one or more sensors disposed on a vehicle; a calibration object including a calibration pattern for calibrating the one or more sensors; a calibration guide disposed on the vehicle; and a computing device in communication with the calibration guide, comprising: one or more processors for controlling operations of the computing device; and a memory for storing data and program instructions used by the one or more processors, wherein the one or more processors are configured to execute instructions stored in the memory to: indicate to a user of the vehicle, using the calibration guide, a correct location for the calibration object.

In another exemplary implementation, a computerized method is disclosed, including: indicating to a user of a vehicle, using a calibration guide disposed on the vehicle, a correct location for a calibration object having a calibration pattern, wherein one or more sensors disposed on the vehicle are configured to auto-calibrate by observing the calibration object at the correct location.

BRIEF DESCRIPTION OF THE DRAWINGS

FIG. 3A is a pictorial representation of an auto-calibration procedure for a sensor using a calibration object.

FIG. 3B is a pictorial representation of an example calibration object that can extend and collapse in a telescoping fashion.

FIG. 3C is a pictorial representation of an example calibration object that can extend and collapse in a sliding fashion.

FIG. 3D is a pictorial representation of an example calibration object that can extend and collapse in a pivoting fashion.

DETAILED DESCRIPTION

Disclosed herein are systems and methods for calibrating sensors for an autonomous vehicle. A calibration guide disposed on the vehicle can indicate to a user the correct location and positioning for a calibration object to be placed for a calibration procedure. In one implementation, a laser guide can project an image indicating the correct location and positioning for the calibration object. In another implementation, an extendible arm disposed on the vehicle can suspend the calibration object at the correct location and positioning. In another implementation, an autonomous robot carrying the calibration object can autonomously bring the calibration object to the correct location and in the correct position and orientation. The calibration guide can be unobtrusively stored within the vehicle when not in use.

Figure 1:
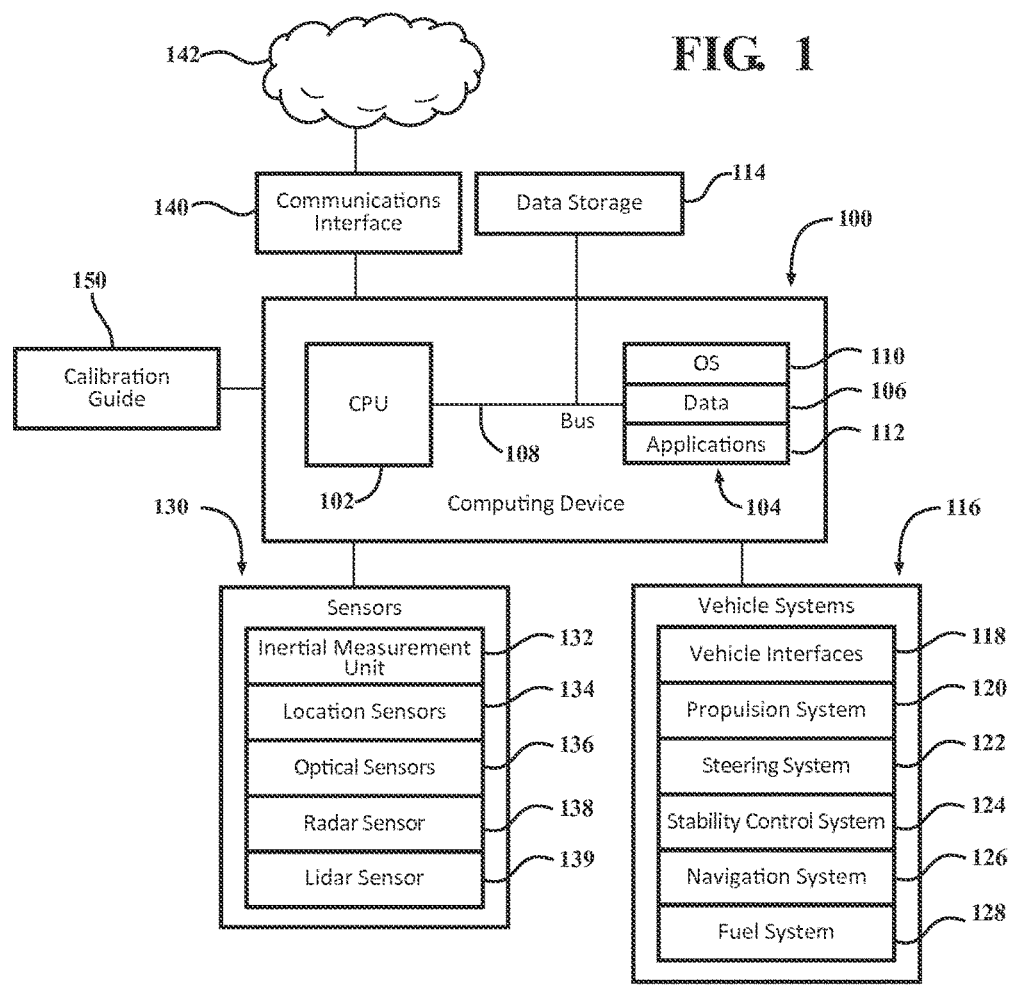
FIG. 1 is a schematic block diagram of a computing device for controlling an autonomous vehicle, sensors, and a calibration guide.
Figure 2:
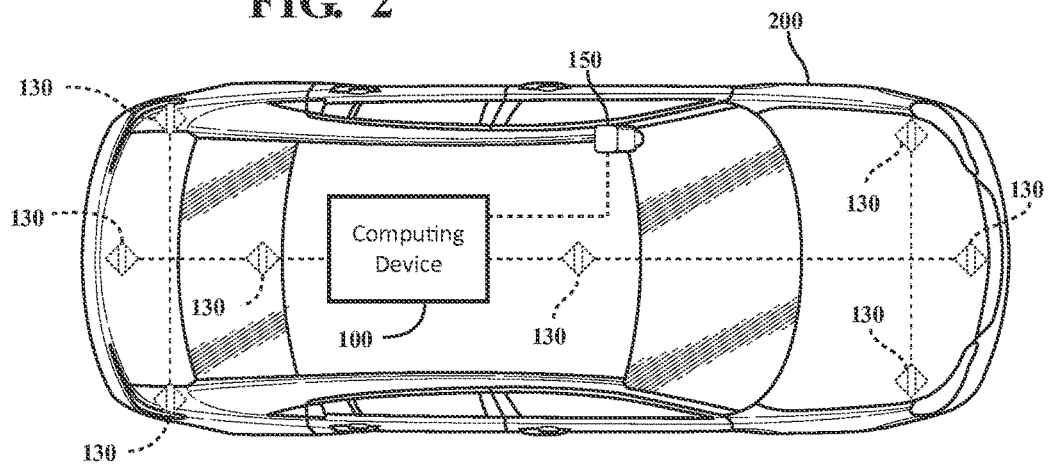
FIG. 2 is a pictorial representation of an example autonomous vehicle having sensors and a calibration guide.

FIG. 1 is a schematic block diagram of a computing device 100 associated with a vehicle 200 (such as depicted in FIG. 2). The computing device 100 can be any type of vehicle-installed, handheld, desktop, or other form of single computing device, or can be composed of multiple computing devices. A processing unit in the computing device 100 can be a conventional central processing unit (CPU) 102 or any other type of device, or multiple devices, capable of manipulating or processing information. A memory 104 in the computing device 100 can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs or apps that permit the CPU 102 to implement the autonomous features of the vehicle 200 as well as the auto-calibration features. The computing device 100 can also include secondary, additional, or external storage 114, for example, a memory card, flash drive, or any other form of computer readable medium. In one implementation, the applications 112 can be stored in whole or in part in the external storage 114 and loaded into the memory 104 as needed for processing.

The computing device 100 can be in direct or indirect communication with one or more vehicle systems 116 to control various vehicle functions. The vehicle systems 116 can include one or more vehicle interfaces 118 that can allow the driver to communicate with the computing device 100 or receive information from the computing device 100. The vehicle interfaces 118 can include, for example, one or more interactive displays, audio systems, voice recognition systems, buttons and/or dials, haptic feedback systems, or any other similar systems used for inputting or outputting information. Other example vehicle systems 116 can include a propulsion system 120; a steering system 122; a stability control system 124; a navigation system 126; a fuel system 128; and any other systems that can control various vehicle functions (such as the vehicle climate, entertainment functions, etc.).

The propulsion system 120 can control the engine, motor, transmission, and/or other vehicle controls that are used for piloting the vehicle 200. The navigation system 126 can be used for establishing the route or directions for the vehicle, and can include maps and/or can connect to external or remote sources for determining an optimal route. The stability control system 124 can activate brakes or motors to one or more of the wheels to maintain the stability of the vehicle 200, including, for example, as to proper yaw. The fuel system 129 can control the fuel usage, which may be in the form of gasoline, natural gas, diesel oil, batteries, fuel cells, or the like. The vehicle systems 116 can be in communication with various actuators that can be used to implement the functions controlled by a particular vehicle system 116. For example, the propulsion system 120 can cause an actuator to move the position of a throttle plate based on the position of an accelerator pedal. In this way, the various vehicle systems 116 can control or affect the operation of the engine, motor, battery system, accelerators, brakes, steering, transmission, or other vehicle systems 116.

The computing device 100 can also be in direct or indirect communication with one or more sensors 130 that can capture data indicative of performance of the vehicle 200 and vehicle systems 116. The sensors 130 can be used to measure movement of the vehicle 200, such as direction, speed, acceleration, yaw, etc. The data received from the sensors 130 can allow the computing device 100 control the vehicle systems 116. Example sensors 130 can include accelerometers, gyroscopes, and/or magnetometers, one or more of which can be combined in an inertial measurement unit (IMU) 132. Location sensors 134 can use a global positioning satellite system (GPS) to determine the location of the vehicle 200. Optical sensors 136 such as cameras can capture image data using charge coupled devices (CCD), complementary metal oxide semiconductors (CMOS), or similar image-capturing elements. Radar sensors 138 and/or lidar sensors 139 (using radio or light detection, respectively) can help identify objects in the vicinity of the vehicle 200, such as other vehicles or environmental features. Among other information measurable by the sensors 130, the sensors 130 can detect vehicle speed, vehicle direction, vehicle acceleration, vehicle rotation, vehicle location, environmental weather conditions, traffic conditions, and road conditions.

The computing device 100 can also include a communications interface 140 through which the computing device 100 can communicate with external sources over a network 142 such as the internet. In addition, the computing device 100 can be in direct or indirect communication with a calibration guide 150 for indicating to a user a correct location for a calibration object 300, as described herein.

The sensors 130 may occasionally become misaligned due to normal use or sudden jolts. For example, the angle at which the lens of an optical sensor 136 is pointing can become misaligned. In such instances, the sensors 130 will need to be calibrated. The disclosed systems, devices, and methods can allow a consumer user of the vehicle 200 to execute an auto-calibration procedure without requiring a professional technician.

FIG. 2 is a pictorial representation of the vehicle 200 in direct or indirect communication with the computing device 100. The computing device 100 can be located within the vehicle 200 or can be located remotely from the vehicle 200 in an alternate location. If the computing device 100 is remote from the vehicle 200, the vehicle 200 can include the capability of communicating with the computing device 100, such as through the communications interface 140. It should be noted that in this disclosure, the vehicle 200 is generally described an automobile. However, the vehicle 200 is not limited to an automobile, as the disclosed systems and methods could also be implemented with other vehicles generally controlled by a driver, or operator, such as airplanes, boats, trains, etc.

One or more sensors can be disposed on the vehicle 200, such as the sensors 130 described in reference to FIG. 1. For example, one or more sensors 130 included in an IMU 132 can be configured to capture changes in velocity, acceleration, wheel revolution speed, yaw, and/or distance to objects within the surrounding environment for use by the computing device 100 to estimate position and orientation of the vehicle 200 and steering angle. One or more sensors 130 can also capture data representative of changes in x, y, and z-axis position, velocity, acceleration, rotation angle, and rotational angular rate for the vehicle 200 and similar data for objects proximate to the navigation route of the vehicle 200. If the sensors 130 capture data for a dead-reckoning system, data relating to wheel revolution speeds, travel distance, steering angle, and steering angular rate of change can be captured.

As another example, lidar sensors 139 can capture data related to laser returns from physical objects in the area surrounding the vehicle 200 with ranging distances calculated by measuring the time it takes for a signal to return to the lidar sensor 139. Laser returns can include the backscattered light reflected by objects hit by a source of light, e.g. laser light, being emitted by the lidar sensors 139 or another source disposed on or proximate to the vehicle 200. Once the light is reflected by an object, the lidar sensors 139 can capture intensity values and reflectivity of each point on the object to be used for analyzing and classifying the object, for example, one of the applications 112 stored within or accessible to the computing device 100. In addition, one or more sensors 130 can also be used to detect markings on the road or on traffic signs. For example, optical sensors 136 can capture images for processing by the computing device 100.

FIG. 3A is a pictorial representation of an auto-calibration procedure for a sensor 130 using a calibration object 300. The calibration object 300 can be an object of a known (a priori) geometry positioned in a known three-dimensional space. Because the geometry of the object is known in advance, a computer controlling the camera can compensate for variations between the object as observed and the known actual dimensions of the object. Thus the calibration object 300 can be used to calibrate the sensors 130 such as the optical sensors 136, which can be either in a single-camera or multi-camera (e.g., stereo) arrangement. Commonly, calibration objects may include a calibration pattern 310, such as a checkerboard pattern, having known dimensions. By observing the calibration object 300 at a predefined position, distance, and orientation using a sensor 130, the computing device 100 can be able to calibrate that sensor 130. One method of performing such calibration using a calibration object is described in Z. Zhang, O. Faugeras, R. Deriche, "An Effective Technique for Calibrating a Binocular Stereo Through Projective Reconstruction Using Both a Calibration Object and the Environment," *Videre: Journal of Computer Vision Research,* MIT Press, Vol. 1, No. 1, pages 58-68, 1997, which is hereby incorporated by reference. Other methods or algorithms may also be used without departing from the spirit and scope of this disclosure.

In one exemplary implementation, the sensors 130 to be calibrated can include the radar sensor 138 and/or the lidar sensor 139, which can detect other subsets of the electromagnetic spectrum. In such cases, the calibration pattern 310 used may be different from the checkerboard pattern used for the optical sensors 136. For example, the pattern can be based on a textured surface rather than a flat image. In addition, some sensors 130 can be calibrated together or jointly, such as, for example, the radar sensor 138 and the lidar sensor 139, while other sensors 130 are calibrated separately, such as, for example, the optical sensors 136.

As the abovementioned article explains, in order to effectively calibrate, a calibration object must be observed while positioned in a known three-dimensional space "with very good precision." Accordingly, in practice, it can be difficult for an ordinary user of a consumer vehicle to position the calibration object 300 relative to the sensors 130 with the necessary precision. One solution can be to require the user to bring the vehicle 200 to a dealership for service, where it can be properly calibrated by a trained professional under controlled conditions. However, this can be burdensome for the user. This disclosure describes novel devices, systems, and methods that will enable a user to easily and accurately position the calibration object 300.

Users can be reminded to calibrate the sensors 130 using a notification or alert (for example, using a vehicle interface 118 such as an interactive display or audio system). The notifications or alerts can be issued periodically or at certain triggers, for example, based on a defined amount of time that has passed or a defined number of miles driven since the last calibration. Additionally, IMUs 132 in the vehicle 200 can be configured to detect a large jolt to the vehicle (which may arise if the vehicle hits a severe bump or pothole, for example) that may have affected the alignment of the sensor 130. IMUs 132 can be installed very near or incorporated into the sensors 130 to more accurately detect or predict whether such sensors 130 have become misaligned.

In addition to the sensors 130, a calibration guide 150 can be disposed on the vehicle 200. The calibration guide 150 can be used to indicate to the user of the vehicle 200 how to position the calibration object 300 for an auto-calibration procedure. FIGS. 3B-3D are pictorial representations of other example configurations for the calibration object 300. Each of these example configurations can allow the calibration object 300 to fold or collapse for easy storage in the vehicle 200 when not needed for a calibration procedure.

FIG. 3B depicts a calibration object 300 that can extend and collapse in a telescoping fashion. The calibration object 300 can include a telescoping mechanism 312 enabling the calibration object 300 to expand and contract such that it can be fully extended for use and collapsed for storage.

FIG. 3C depicts a calibration object 300 that can extend and collapse in a sliding fashion. The calibration object 300 can include a sliding mechanism 314 enabling the calibration object 300 to extend side-to-side so that it can be fully extended for use and collapsed for storage.

FIG. 3D depicts a calibration object 300 that can extend and collapse in a pivoting fashion. The calibration object 300 can include a pivoting mechanism 316 (for example, using a hinge) enabling the calibration object 300 to unfold upright for use and to fold down/flat for storage.

The foregoing configurations or any other familiar mechanisms or means that generally allow an object to be in either an extended state or collapsed state can be employed with respect to the calibration object 300 (including in conjunction with any of the calibration guides described in the below implementations) without departing from the spirit and scope of the invention.

Figure 4:
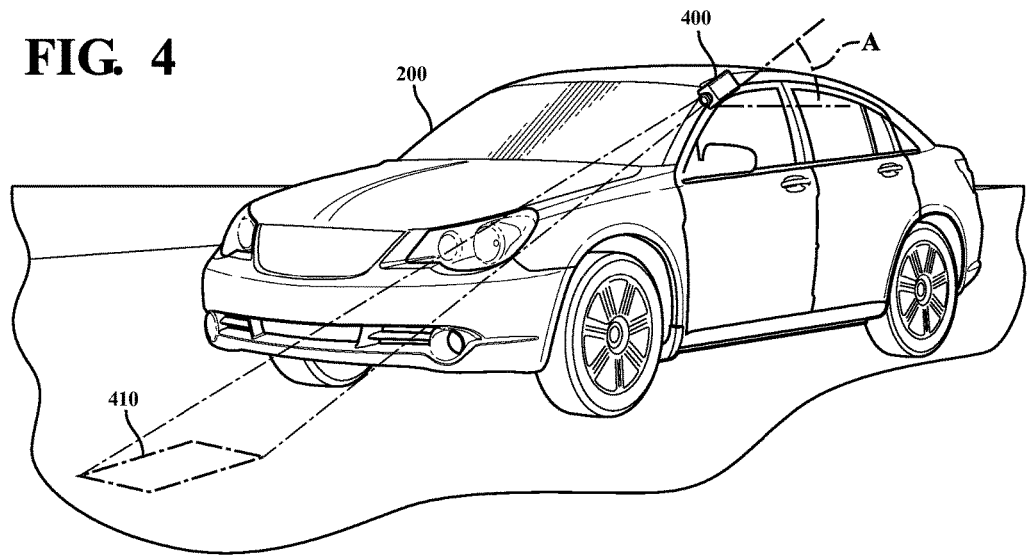
FIG. 4 is a pictorial representation of a laser projector configured to indicate a correct location for a calibration object.

FIG. 4 is a pictorial representation of the vehicle 200 including a laser guide 400 for use with the calibration object 300. In accordance with one example implementation, the laser guide 400 can be a laser projection device disposed on the body of the vehicle 200, positioned in a particular direction at a predefined angle A. Based on the angle A, the laser guide 400 can be configured to project an image 410 at a predefined location relative to the vehicle 200 useful for positioning the calibration object 300 for a calibration procedure. The image 410 can indicate to the user where to place and how to orient the calibration object 300. Accordingly, it can be known with sufficient precision the positioning of the calibration object 300 relative to the sensor(s) 130 to be calibrated. This can allow the user to set up the calibration object 300 properly for the calibration procedure.

In one exemplary implementation, the image 410 can be a simple dot, and the user can be instructed to orient the calibration object 300 so that the calibration pattern 310 faces the sensor 130 to be calibrated. In another exemplary implementation, the image 410 can indicate to the user the proper positioning and orientation of the calibration object 300. For example, the image 410 can be a footprint (i.e., an outline) matching the shape of an asymmetrically shaped base connected to the calibration object 300 (not shown), so that only one possible orientation of the calibration object 300 will permit the calibration object 300 to fit into the footprint indicated by the projected image 410.

In one exemplary implementation, when the sensors 130 detect that the calibration object 300 occupies the footprint indicated by the projected image 410, the computing device 100 can be configured to begin the auto-calibration procedure automatically, without requiring any additional instructions or commands from the user.

It is contemplated that there may be sensors 130 disposed all around the exterior of the vehicle 200, and therefore the calibration object 300, when positioned at the predefined location, may not be equally visible to all of the relevant sensors 130. In one exemplary implementation, a plurality of laser guides 400 can be disposed on the vehicle 200, each pointing in a different direction and/or at a different angle, so that locations surrounding the vehicle 200 can be marked for placement of the calibration object 300. Alternatively, the laser guide 400 can be configured to rotate so that laser guide 400 can project images 410 at the proper locations surrounding the vehicle 200 in accordance with the fields of view of the sensors 130.

Figure 5:
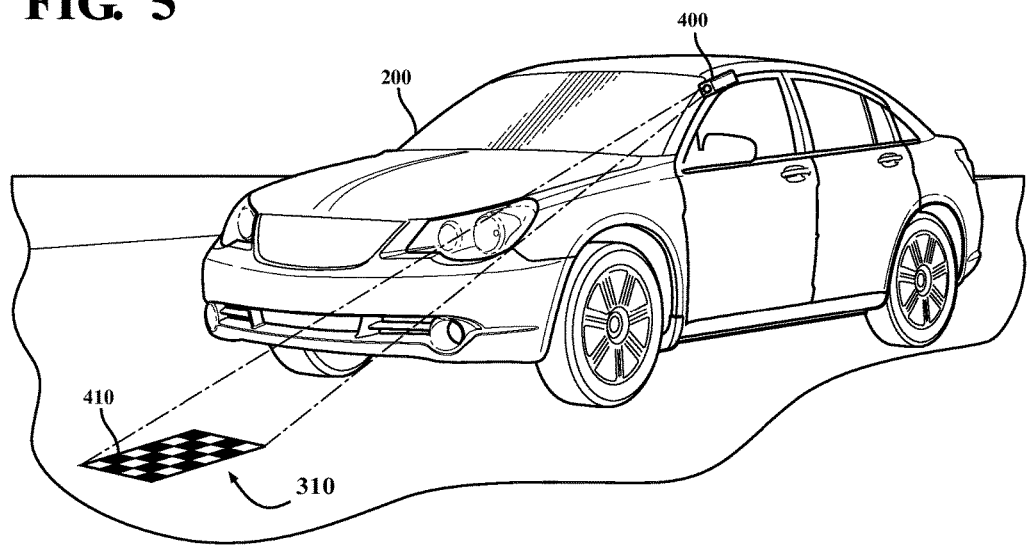
FIG. 5 is pictorial representation of a laser projector configured to project a calibration pattern at a correct location.

FIG. 5 is another pictorial representation of the vehicle 200 including the laser guide 400. In this example implementation, the laser guide 400 can project the calibration image 410 that includes the calibration pattern 310. Accordingly, in this implementation, a separate calibration object 300 would not be needed, as the calibration image 410 can be projected at the correct location. Instead, the patterned calibration image 410 itself can serve as the calibration object 300 to be used in calibrating the sensors 130 as described above.

Figure 6:
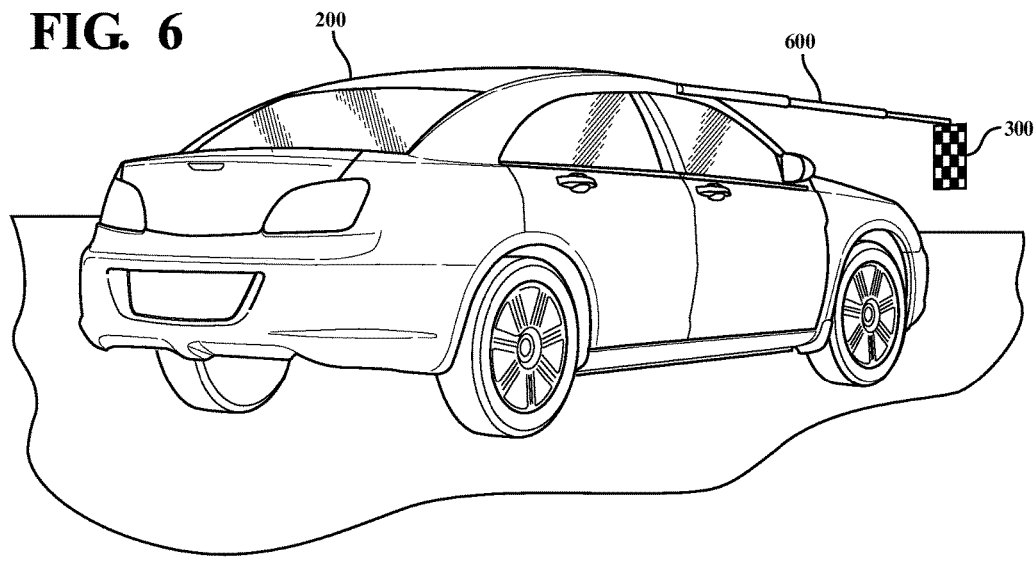
FIG. 6 is a pictorial representation of an extendible arm configured to position a calibration object at a correct location for a calibration procedure.

FIG. 6 is a pictorial representation of the vehicle 200 including an extendible arm guide 600 disposed on the vehicle 200 and used as a calibration guide. The extendible arm guide 600 can alternately extend and collapse in a telescoping fashion. The extendible arm guide 600 can also be disposed on the vehicle 200 in a particular position such that when the extendible arm guide 600 is fully extended, the terminus of the extendible arm guide 600 can reach the correct location for positioning the calibration object 300. The calibration object 300 can be configured to connect to the terminus of the extendible arm guide 600 so that when the extendible arm guide 600 is in its fully extended state, the calibration object 300 can be suspended at precisely the correct location and oriented in the correct direction for the sensors 130 to observe the calibration object 300 pursuant to the auto-calibration procedure.

As described above, the calibration object 300 can be configured to collapse when not in use (for example, as described in FIGS. 3B-3D). In one exemplary implementation, the calibration object 300 can be connected to the extendible arm guide 600 using a hinge or other pivoting mechanism, allowing the calibration object 300 to unfold and swing downward when the extendible arm guide 600 is fully extended. In another exemplary implementation, the calibration object 300 can be constructed of a thin, flexible material and can be configured to roll up and down like a window shade. When the extendible arm guide 600 is fully extended, the calibration object 300 can be unrolled and when the extendible arm guide 600 is collapsed for storage the calibration object 300 can be rolled up and stored together therewith. In either case, when the extendible arm guide 600 is in its fully extended state, the calibration object 300 can be suspended at precisely the correct location and oriented in the correct direction to be observed by the sensors 130 pursuant to the auto-calibration procedure.

A plurality of extendible arm guides 600 can be disposed on the vehicle 200 extending in various directions, in order to position calibration objects 300 at locations observable to sensors 130 on different sides of the vehicle 200. Alternatively, a single extendible arm guide 600 can be configured to rotate so that the calibration object 300 suspended therefrom can be observable to sensors 130 on different sides of the vehicle 200. In another alternative, a single extendible arm guide 600 can be a manipulator arm having a number of joints, each of which is manipulable (not shown). The joints can be either manipulated independently from each other or controlled in a coordinated fashion, for example by the computing device 100. Thus, the joints of the extendible arm guide 600 can be manipulated such that the calibration object 300 can be moved to different sides of the vehicle 200 to be observable by different sensors 130. In one exemplary implementation, the calibration object 300 can be connected to the extendible arm guide 600 via a pivoting mechanism (for example, using a hinge), allowing the calibration object 300 to unfold and swing downward when the extendible arm guide 600 is fully extended. In one exemplary implementation, the manipulation of the joints can be automatically controlled by the computing device 100.

Figure 7:
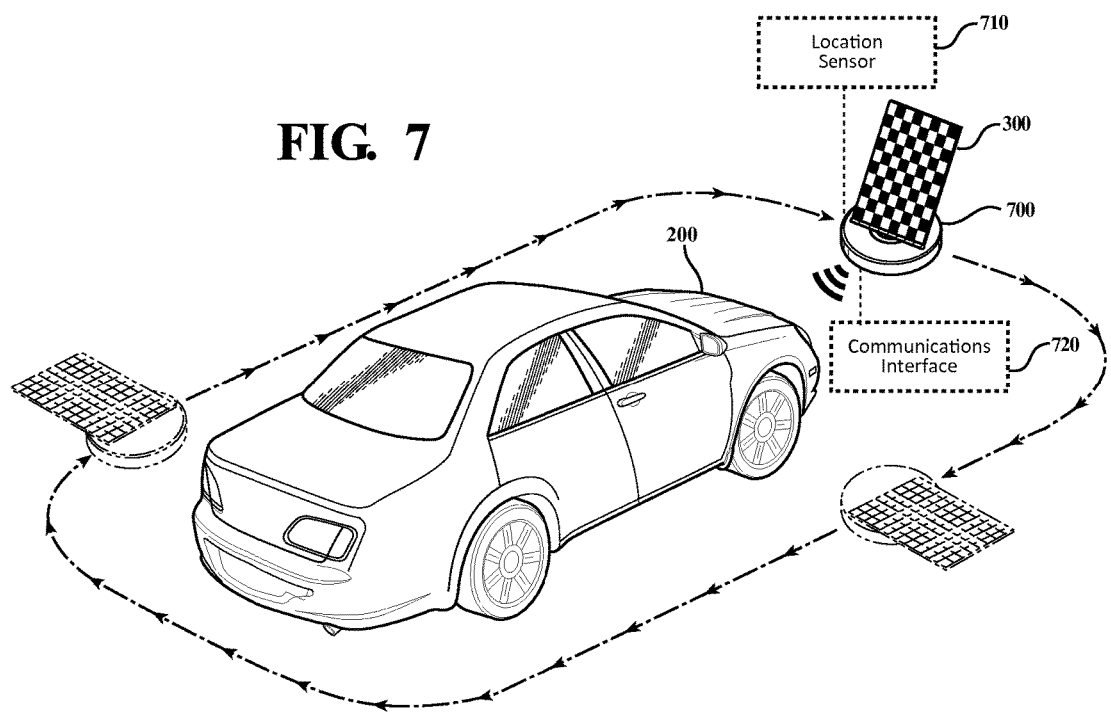
FIG. 7 is a pictorial representation of an autonomous robot configured to position a calibration object at a correct location for a calibration procedure.

FIG. 7 is a pictorial representation of the vehicle 200 including a robot guide 700. The robot guide 700 can be connected to the calibration object 300 and serve as a movable base therefor. The robot guide 700 can include wheels and be configured to navigate autonomously, for example controlled by a computing device similar to the vehicle's 200 computing device 100. The robot guide 700 can be configured to autonomously navigate to the predefined location relative to the vehicle, thus allowing the calibration object 300 to be observable by the sensors 130 for the auto-calibration procedure. In one exemplary implementation, the calibration object 300 can be connected to the robot guide 700 using a hinge or other pivoting mechanism, allowing the calibration object 300 to unfold and swing upward when the robot guide 700 arrives at the correct location. After the auto-calibration procedure is completed, the calibration object 300 can fold back down, lying flat against the robot guide 700 for storage.

In one example implementation, the robot guide 700 can include a location sensor 710 to receive GPS signals, and a wireless communications interface 720 to communicate with the vehicle 200. The computing device 100 in the vehicle 200 can communicate the vehicle's 200 location (captured by the vehicle's 200 location sensor 134) to the robot guide 700. With the robot guide's 700 location learned from its own location sensor 710 and the vehicle's 200 location sent by the computing device 100, the robot guide 700 can determine the correct location to navigate to relative to the vehicle's 200 location. When the robot guide 700 arrives at the correct location, it can be configured to swivel to face the vehicle 200 so that the calibration object 300 is observable at the proper orientation. The robot guide 700 can be configured to stop at multiple locations surrounding the vehicle 200 in order to calibrate sensors 130 on different sides of the vehicle.

A compartment can be included in the vehicle 200 for storing the robot guide 700 when not in use (not shown). The compartment can be on the underside of the vehicle 200 with a door that swings downward to form a ramp leading directly to the ground. Accordingly, the robot guide 700 can autonomously navigate out of the vehicle 200 without requiring the user to carry it and place it on the ground. In addition, releasing the robot guide 700 from a special compartment can ensure that the robot guide 700 starts a travel route from the same point relative to the vehicle 200. Therefore, in another exemplary implementation, the robot guide 700 can travel along a predefined route to the correct location(s) for the calibration procedure using dead reckoning, even where a GPS signal is not available. For example, the robot guide 700 can include preprogrammed instructions to make certain predefined turns and travel predefined distances in predefined directions upon being released from the compartment, in order that it will arrive at the correct location(s).

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. For example, the user in this disclosure is generally identified as the driver of the vehicle 200. However, the user may be any occupant or authorized user without departing from the spirit and scope of the appended claims. The scope of the claims is thus to be accorded the broadest interpretation so as to encompass all such modifications and equivalent structures as is permitted under the law.

What is claimed is:

1. A system comprising:
   a vehicle;
   one or more sensors disposed on the vehicle;
   a calibration guide disposed on the vehicle, the calibration guide being configured to project an image onto a surface at a predefined location relative to the vehicle; and
   a computing device including:
      one or more processors for controlling operations of the computing device; and
      a memory for storing data and program instructions used by the one or more processors, wherein the one or more processors are configured to execute instructions stored in the memory to:
         cause the calibration guide to project an image at the predefined location relative to the vehicle, the image indicating a correct location for a calibration object; and
         when a calibration object is in the correct location indicated by the projected image, automatically calibrate the one or more sensors using the calibration object, the calibration object including a calibration pattern for calibrating the one or more sensors.

2. The system of claim 1, wherein the correct location for the calibration object is a location for the calibration object that enables the one or more sensors to auto-calibrate by observing the calibration object.

3. The system of claim 1, wherein the calibration object is configured to collapse for storage.

4. The system of claim 3, wherein the calibration object is configured to collapse for storage using at least one of: sliding means, telescoping means, and rotating means.

5. The system of claim 1, wherein the calibration guide comprises a laser projection device.

6. The system of claim 5, wherein the image projected by the laser projection device indicates a correct orientation for the calibration object.

7. A computerized method comprising:
   causing, using one or more processors, a calibration guide to project an image at a predefined location relative to a vehicle, the image indicating a correct location for a calibration object; and
   when a calibration object is in the correct location indicated by the projected image, automatically calibrate one or more sensors using the calibration object, the calibration object including a calibration pattern for calibrating one or more sensors disposed on the vehicle.

8. The method of claim 7, wherein the calibration object is configured to collapse for storage.

9. The method of claim 7, wherein the calibration guide comprises a laser projection device.

10. A system comprising:
    a vehicle;
    one or more sensors disposed on the vehicle;
    a calibration guide disposed on the vehicle, the calibration guide being configured to project an image onto a surface at a predefined location relative to the vehicle, the image including a calibration pattern; and
    a computing device in communication with the calibration guide, comprising:
       one or more processors for controlling operations of the computing device; and
       a memory for storing data and program instructions used by the one or more processors, wherein the one or more processors are configured to execute instructions stored in the memory to:
          cause the calibration guide to project the image at the predefined location relative to the vehicle; and
          automatically calibrate the one or more sensors using the calibration pattern included in the image.

11. A computerized method comprising:
    causing, using one or more processors, a calibration guide to project an image at a predefined location relative to a vehicle, the image including a calibration pattern; and
    automatically calibrating one or more sensors disposed on the vehicle using the calibration pattern included in the image.

12. A system comprising:
    a vehicle;
    one or more sensors disposed on the vehicle;
    an extendable arm disposed on the vehicle, the extendable arm being movable between a retracted position and an extended position;
    a calibration object including a calibration pattern for calibrating the one or more sensors, the calibration object being attached to the extendable arm; and
    a computing device including:
       one or more processors for controlling operations of the computing device; and
       a memory for storing data and program instructions used by the one or more processors, wherein the one or more processors are configured to execute instructions stored in the memory to:
          cause the extendable arm to move to the extended position such that the calibration object is located at a predefined location relative to the vehicle; and
          automatically calibrate the one or more sensors using the calibration object.

13. A computerized method comprising:
    causing, using one or more processors, an extendable arm to move to an extended position such that a calibration object attached to the extendable arm is located at a predefined location relative to a vehicle, the extendable arm being disposed on the vehicle, the calibration object including a calibration pattern for calibrating one or more sensors disposed on the vehicle; and
    when the extendable arm is in the extended position, automatically calibrating the one or more sensors using the calibration object.

14. A system comprising:
    a robot guide, the robot guide configured to navigate autonomously;
    a calibration object including a calibration pattern for calibrating one or more sensors, the calibration object being connected to the robot guide;
    a vehicle;
    one or more sensors disposed on the vehicle;
    one or more processors operatively connected to the robot guide to cause the robot guide to navigate autonomously relative to the vehicle to a correct location for the calibration object; and
    one or more processors configured to automatically calibrate the one or more sensors using the calibration object when the calibration object is located in the correct location.

15. A computerized method comprising:
  causing, using one or more processors, a robot guide to navigate autonomously relative to a vehicle to a correct location for a calibration object connected to the robot guide, the calibration object including a calibration pattern for calibrating one or more sensors; and
  when the calibration object is located in the correct location, automatically calibrating the one or more sensors using the calibration object.

16. The system of claim 12, wherein the extendible arm has a terminus such that when the extendible arm is in the extended position, the terminus is at a correct location.

17. The system of claim 14, wherein the robot guide is configured to autonomously travel to the correct location using a location sensor.

18. The system of claim 14, wherein the robot guide is configured to autonomously travel to the correct location using dead reckoning based on a starting location relative to the vehicle.

19. The method of claim 13, wherein the extendible arm has a terminus such that when the extendible arm is in the extended position, the terminus is at a correct location.

20. The system of claim 16, wherein the calibration object is configured to suspend from the terminus of the extendible arm at a correct orientation.

* * * * *